Patented Jan. 3, 1950

UNITED STATES PATENT OFFICE 2,492,994

BITUMINOUS COMPOSITIONS

Denham Harman, Berkeley, and Harry J. Sommer, Lafayette, Calif., assignors to Shell Development Company, San Francisco, Calif., a corporation of Delaware No Drawing. Application May 11, 1948,
Serial No. 26,481

6 Claims. (Cl. 106—273)

This invention relates to improvements in bituminous materials. More particularly, it is concerned with improvements in the adhesion characteristics of bituminous compositions.

The adherence of bituminous substances, such as asphalt, to mineral aggregates has been the subject of numerous investigations. Many proposals have been made for improving the adherence of asphalt to solid surfaces. The necessity for improving naturally-occurring asphalts in this respect is especially marked in the presence of moisture. In the absence of any "anti-stripping agent," most asphalts are more or less readily displaced from aggregate surfaces upon influences such as normal weathering. The phenomenon of stripping is especially noticeable in localities subject to wide fluctuations in temperature. In these locations, it has been found that asphalt pavements rapidly disintegrate, especially during alternate freezing and thawing periods.

Among the many types of adhesion agents which have been proposed to overcome these difficulties are oleophilic, high molecular weight fatty acids, and certain salts, esters and amines. Many of these are suitable when exposed in arid climates; however, due to the hygroscopic nature of many of the additives, they are unsuitable for use in compositions which will be exposed to wet weather. Furthermore, a number of adhesion agents previously proposed tend to cause emulsification when water is present, even though they cause increased adhesion of asphalt to a dry aggregate.

It is an object of the present invention to improve the adhesion characteristics of asphalt compositions. It is another object of this invention to improve the anti-stripping characteristics of asphalt compositions subject to weathering. Other objects will become apparent during the following discussion.

Now, in accordance with this invention, it has been found that the adhesion characteristics and load-bearing capacity of bituminous compositions are substantially improved, even in the presence of moisture, by adding thereto certain organic phosphorous acids, as more particularly described hereinafter.

The acids referred to include especially the phosphinic and phosphonic acids bearing at least one lipophilic hydrocarbyl group. These acids have the general structure:

wherein R is a lipophilic hydrocarbyl group and X is a hydrogen atom, a hydroxyl group or a hydrocarbon radical. It will be noted that this general formula includes mono-hydrocarbonphosphinic acids, di-hydrocarbonphosphinic acids, and the hydrocarbonphosphonic acids. The lipophilic radical is preferably one having from ten to twenty-four carbon atoms. Still more preferably, this group is a saturated aliphatic hydrocarbon radical and, of this type, the substantially unbranched alkyl radicals appear to be the most suitable. However, the group may alternatively be cycloalkyl, aryl, alkaryl, aralkyl, etc.

Suitable mono-hydrocarbonphosphinic acids include tetradecane-1-phosphinic acid, pentadecene-1-phosphinic acids and 3,5-di-isobutylbenzene-phosphinic acid.

With reference to the di-hydrocarbonphosphinic acids, at least one of the hydrocarbyl groups must have lipophilic properties. The second radical may be of a similar or identical nature or may be of an entirely different type; hence, in the general formula, X may be a hydrocarbon radical having from one to twenty-four carbon atoms, such as methyl, octyl, dodecyl, octadecyl, naphthenyl, naphthyl, etc. Preferred species of this sub-genus include di-octadecane-1-phosphinic acid, phenyltetradecanephosphinic acid and methylhexadecane-1-phosphinic acid.

The phosphonic acids, as pointed out above, constitute a third variety of the adhesion agents included in the present invention. Especially effective species are dodecane-1-phosphonic acid, octadecane-1-phosphonic acid, 10-phenyldecane-1-phosphonic acid and 2,4-diamylcyclohexane-phosphonic acid.

In certain instances the hydrocarbon radicals may bear other substituents such as hydroxyl, carboxyl or carbonyl groups, etc.

A number of methods are available for the preparation of phosphinic and phosphonic acids. The methods heretofore employed vary widely in their individual operational steps, but substantially all of them employ the reactions of phosphorus halogen compounds to attain carbon-to-phosphorus bonds. While it has long been known to be possible to form such bonds by reacting alkyl halides with phosphine, or by the use of Grignard reagents, such methods are not usually feasible in commercial-scale operations. It is also known that certain aromatic phosphonates and phosphinates can be obtained by heating benzene with phosphorus trichloride in the presence of aluminum chloride or by passing the mixed vapors through a red-hot tube, thus forming the derivative of phosphine, phenyl phosphorus dichloride. The dichloride can be hydrolyzed to the phosphinic acid, which, in turn, can be oxidized by hydrogen peroxide or other oxidizing agents to the phosphonic acid. This method, however, is not well suited for the production of the aliphatic compounds.

Perhaps the most general method heretofore known for producing alkyl phosphonates or phosphinates involves the reaction of phosphorus trichloride with an alcohol or preferably an alkali metal alcoholate to form a trialkyl phosphite and the isomerization of the phosphite to a dialkyl phosphonate by reaction with an alkyl halide. The above reaction process is complex and the yields were reported by Arbuzov (J. Gen. Chem. (USSR), 4, 898-900 (1934), critically to depend upon the size and structure of the alkyl radical, the character of the halide, the quantities employed, and the temperature of the reaction. Later work by Kharash, Jensen and Urry (J. Am. Chem. Soc. 67 1864 (1945) and U. S. Patent 2,425,766) indicates that phosphorus trichloride or phosphorus pentachloride may be added to olefines to form compounds such as $RCHClCH_2PCl_2$ or $RCHClCH_2PCl_4$ from which unsaturated phosphonates can then be formed by treating the phosphorus-containing alkyl halides with phosphorus pentoxide.

An improved process for the preparation of phosphonates and phosphinates is described in a copending patent application, Serial No. 20,608, filed April 12, 1948, of which one of the present applicants is a co-inventor. In any of the processes which result in the formation of metallic salts or esters of the acids, the corresponding free acid may be readily obtained by simple acidification of the salts or hydrolysis of the ester groups. The application referred to points out that sodium mono-alkane phosphinates may be prepared by heating sodium hypophosphite and an olefin in the presence of a free radical source, such as organic peroxides. Sodium dialkane phosphinates may be obtained by treating this product with a further quantity of an olefin, again in the presence of a free radical source. Substituted phosphonic acid esters are readily prepared by the interaction of a dialkyl phosphite and an olefin in the presence of a free radical source. The esters are then subjected to hydrolysis in order to produce the free phosphinic acid.

The subject phosphorous acids may be dispersed in bituminous material to the extent of 0.1-5.0% by weight of the bituminous substance. Alternatively, the acids may be sprayed or otherwise applied to the surface of an aggregate or other type of surface, which is then coated with asphalt. It has been found that phosphorous acids, described as above, are highly effective antistripping agents for both acidic and basic surfaces, such as those of limestone or granite aggregate, respectively.

The term "bituminous material" is meant to include substances containing asphaltenes or tarry constituents and comprises, for example, asphaltic bitumens, bitumen cut-backs, asphalts, asphaltic solutions or dispersions, petroleum distillation residues, pitches, road oils, albino asphalts and coal tars. The compositions may contain a carrier, such as kerosene or may be dispersed in water in the form of an emulsion.

The effectiveness of the additives was tested by the recognized "total water immersion test," the results of which are expressed as "T. W. I. T. values," each unit of which represents 10% of an aggregate surface which remains coated with asphalt after exposure to the action of water. In the present case, a medium cure asphalt cut-back containing 1% by weight of n-octadecane-1-phosphonic acid was coated on soda rhyolite and limestone rocks. The individual particles of which passed a one-fourth-inch screen but were retained by a one-half-inch screen. Previous to coating with the asphalt, the surface of the aggregate particles was treated with 2% by weight of water. After coating, the particles were covered to a depth of one-half inch with distilled water for three hours at 40° C. The T. W. I. T. values in all cases were between 9 and 10. Similar results were obtained by the use of n-tetradecane-1-phosphinic acid In the absence of any additive, the T. W. I. T. value was 2.

We claim as our invention:

1. An asphalt composition consisting essentially of a major amount of asphalt and 0.1-5.0% by weight of n-octadecane-1-phosphonic acid.

2. An asphalt composition consisting essentially of a major amount of asphalt and 0.1-5% by weight of n-tetradecane-1-phosphinic acid.

3. A bituminous composition consisting essentially of a major amount of asphalt and 0.1-5.0% by weight of a phosphinic acid bearing at least one lipophilic hydrocarbon radical bonded directly to the phosphorus atom.

4. A bituminous composition consisting essentially of a major amount of asphalt and 0.1-5% by weight of a phosphonic acid, said acid bearing a lipophilic hydrocarbon radical bonded directly to the phosphorus atom.

5. An asphalt composition consisting essentially of a major amount of an asphalt and 0.1-5.0% by weight of an acid having the structure:

wherein R is an aliphatic hydrocarbon radical having 10-24 carbon atoms and X is a radical of the group consisting of a hydrogen atom, a hydroxyl group and a hydrocarbon radical.

6. A bituminous composition consisting essentially of a major amount of a bituminous material and 0.1-5.0% by weight of an acid having the structure:

wherein R is a lipophilic hydrocarbon radical and X is a radical of the group consisting of a hydrogen atom, a hydroxyl group and a hydrocarbon radical.

DENHAM HARMAN.
HARRY J. SOMMER.

REFERENCES CITED

The following references are of record in the file of this patent:

UNITED STATES PATENTS

| Number | Name | Date |
|---|---|---|
| 2,370,386 | Anderson et al. | Feb. 27, 1945 |
| 2,191,295 | Dohse et al. | Feb. 20, 1940 |